United States Patent
Lee et al.

(10) Patent No.: US 10,862,539 B2
(45) Date of Patent: Dec. 8, 2020

(54) SECONDARY PAD FOR WIRELESS POWER TRANSFER SYSTEM AND MANUFACTURING METHOD THEREOF

(71) Applicants: Hyundai Motor Company, Seoul (KR); Kia Motors Corporation, Seoul (KR); Research & Business Foundation Sungkyunkwan University, Suwon, Gyeonggi-do (KR)

(72) Inventors: Woo Young Lee, Gyeonggi-do (KR); Gyu Yeong Choe, Gyeonggi-do (KR); Min Jung Kim, Gyeonggi-do (KR); Min Kook Kim, Gyeonggi-do (KR); Jong Eun Byeon, Gyeonggi-do (KR); Min Hyuck Kang, Gyeonggi-do (KR); Dong Gyun Woo, Gyeonggi-do (KR); Byoung Kuk Lee, Gyeonggi-do (KR); Dong Myoung Joo, Gyeonggi-do (KR)

(73) Assignees: Hyundai Motor Company, Seoul (KR); Kia Motors Corporation, Seoul (KR); Research & Business Foundation Sungkyunkwan University, Gyeonggi-do (KR)

( * ) Notice: Subject to any disclaimer, the term of this patent is extended or adjusted under 35 U.S.C. 154(b) by 549 days.

(21) Appl. No.: 15/730,960

(22) Filed: Oct. 12, 2017

(65) Prior Publication Data
US 2018/0109292 A1  Apr. 19, 2018

(30) Foreign Application Priority Data
Oct. 17, 2016 (KR) .......................... 10-2016-0134364

(51) Int. Cl.
*H04B 5/00* (2006.01)
*H02J 7/00* (2006.01)
(Continued)

(52) U.S. Cl.
CPC ............. *H04B 5/0037* (2013.01); *H01F 5/04* (2013.01); *H01F 38/14* (2013.01); *H02J 7/0042* (2013.01); *H02J 50/10* (2016.02)

(58) Field of Classification Search
CPC ......... H04B 5/0037; H02J 50/10; H01F 38/14
See application file for complete search history.

(56) References Cited

U.S. PATENT DOCUMENTS

2010/0007215 A1* 1/2010 Sakuma .................. H01F 27/36
307/104
2014/0125140 A1* 5/2014 Widmer ................ B60L 53/122
307/104

(Continued)

*Primary Examiner* — Elvin G Enad
*Assistant Examiner* — Malcolm Barnes
(74) *Attorney, Agent, or Firm* — Mintz Levin Cohn Ferris Glovsky and Popeo, P.C.; Peter F. Corless

(57) ABSTRACT

A reception pad for a wireless power transfer (WPT) system includes: a plate-shaped ferrite; an insulating layer disposed on one side of the ferrite; a first coil layer disposed on the insulating layer; an interlayer insulating layer disposed on the first coil layer; and a second coil layer disposed on the interlayer insulating layer. The insulating layer at least partially surrounds the first coil layer and the second coil layer, the first coil layer and the second coil layer at least partially overlap each other and are arranged in a rectangular ring form on the one side of the ferrite, and a ratio of a width which is larger between a first width of the first coil layer and a second width of the second coil layer to a first length of the ferrite in a width direction corresponding to the first width or the second width is 0.14 to 0.15.

12 Claims, 10 Drawing Sheets

(51) Int. Cl.
  *H02J 50/10* (2016.01)
  *H01F 5/04* (2006.01)
  *H01F 38/14* (2006.01)

(56) References Cited

U.S. PATENT DOCUMENTS

| | | | | |
|---|---|---|---|---|
| 2014/0327391 | A1* | 11/2014 | Niederhauser | B60L 3/003 320/108 |
| 2015/0170833 | A1* | 6/2015 | Widmer | B60L 53/122 307/104 |
| 2015/0288067 | A1* | 10/2015 | Kwon | H01Q 21/30 320/108 |
| 2015/0332845 | A1* | 11/2015 | Werner | H04B 5/0037 307/104 |
| 2016/0126001 | A1* | 5/2016 | Chien | H02J 50/005 336/200 |
| 2017/0040845 | A1* | 2/2017 | Yuasa | H02J 50/12 |
| 2018/0054079 | A1* | 2/2018 | Hirobe | H01F 27/2871 |
| 2018/0358168 | A1* | 12/2018 | Furiya | H02J 50/10 |
| 2019/0207411 | A1* | 7/2019 | Kim | H02J 7/00034 |

* cited by examiner

SECONDARY PAD FOR WIRELESS POWER TRANSFER SYSTEM AND MANUFACTURING METHOD THEREOF

CROSS-REFERENCE TO RELATED APPLICATION

This application claims the benefit of priority to Korean Patent Application No. 10-2016-0134364 filed on Oct. 17, 2016 in the Korean Intellectual Property Office (KIPO), the entire contents of which are hereby incorporated by reference as if fully set forth herein.

TECHNICAL FIELD

The present disclosure relates generally to a power reception pad in a wireless power transfer (WPT) system, and more particularly, to a power reception pad for an electric vehicle (EV) WPT system having an improved coupling coefficient and a manufacturing method thereof.

BACKGROUND

The standard J2954 of the society of automobile engineers (SAE) specifies performance requirements for power levels, interoperability, vertical and horizontal separation distances for rated output, communication methods between the transmission/reception pads, operating frequency, requirements for electromagnetic interference (EMI) and electromagnetic compatibility (EMC), and stability for wireless power transfer systems using magnetic induction for charging batteries of electric vehicles (EVs). SAE J2954 also specifies transmission and reception pads according to power capacities. Thus, most automobile manufacturers adhere to the structures and sizes of transmission and reception pads specified in SAE J2954.

The reception pad mounted on a typical EV should be structured so as to receive the maximum magnetic flux generated from a standard transmission pad, but meanwhile is restricted by the size of the EV. Since the numerical values given in SAE J2954 are not absolute values except for the external size of the corresponding pads, it is necessary to consider the optimal configuration of the transmission/reception pads in order to maximize their performance. Thus, there is a need for an optimal configuration of the wireless power transfer pads.

SUMMARY

Accordingly, embodiments of the present disclosure are provided to substantially obviate one or more problems due to limitations and disadvantages of the related art. Embodiments of the present disclosure provide a reception pad mounted on an EV for a WPT system, which can maximize WPT performance. Embodiments of the present disclosure also provide a manufacturing method of the reception pad.

According to embodiments of the present disclosure, a reception pad for a WPT system includes: a plate-shaped ferrite; an insulating layer disposed on one side of the ferrite; a first coil layer disposed on the insulating layer; an interlayer insulating layer disposed on the first coil layer; and a second coil layer disposed on the interlayer insulating layer. The insulating layer at least partially surrounds the first coil layer and the second coil layer, the first coil layer and the second coil layer at least partially overlap each other and are arranged in a rectangular ring form on the one side of the ferrite, and a ratio of a width which is larger between a first width of the first coil layer and a second width of the second coil layer to a first length of the ferrite in a width direction corresponding to the first width or the second width is 0.14 to 0.15.

The first width and the second width may be equal to each other, and the first width may be approximately 36 millimeters (mm) when the first length of the ferrite is approximately 242 mm.

The thickness of the first coil layer may be equal to the thickness of the second coil layer, and the thickness of the first coil layer may be approximately 4 mm.

Also, the thickness of the interlayer insulating layer may be approximately 2 mm.

Also, the minimum width or the inner diameter of an intermediate region of the rectangular ring form of the first coil layer and the second coil layer may be approximately 160 mm.

The reception pad may further comprise a plate-shaped vehicle assembly (VA) aluminum on another side of the ferrite; a lower insulating layer disposed on the VA aluminum; and a bonding layer disposed between the ferrite and the VA aluminum.

The first width and the second width may be different from each other, and the large width is approximately 36 mm when the first length of the ferrite is approximately 242 mm.

Furthermore, in accordance with embodiments of the present disclosure, a method of manufacturing a reception pad for a WPT system includes: forming a first insulating layer on one side of a plate-shaped ferrite; disposing a first coil layer in a rectangular ring form on the first insulating layer; disposing an interlayer insulating layer on the first coil layer; disposing a second coil layer on the interlayer insulating layer so as to at least partially overlap with the first coil layer; and forming a second insulating layer on the first insulating layer so that the second insulating layer at least partially surrounds the interlayer insulating layer and the second coil layer, and so that the second coil layer is exposed from the second insulating layer. A ratio of a width which is larger between a first width of the first coil layer and a second width of the second coil layer to a first length of the ferrite in a width direction corresponding to the first width or the second width is 0.14 to 0.15.

The first width and the second width may be equal to each other, and the first width may be approximately 36 mm when the first length of the ferrite is approximately 242 mm. Also, the thickness of the first coil layer may be equal to the thickness of the second coil layer, the thickness of the first coil layer may be approximately 4 mm, and the thickness of the interlayer insulating layer may be approximately 2 mm. Also, the minimum width or an inner diameter of an intermediate region of the rectangular ring form of the first coil layer and the second coil layer may be approximately 160 mm.

The method may further comprise disposing a plate-shaped VA aluminum on another side of the ferrite with a bonding layer disposed therebetween; and forming a lower insulating layer on the VA aluminum.

The first width and the second width may be different from each other, and the large width may be approximately 36 mm when the first length of the ferrite is approximately 242 mm. Also, the thickness of the first coil layer may be equal to a thickness of the second coil layer, and the thickness of the first coil layer may be approximately 4 mm. Also, the thickness of the interlayer insulating layer may be approximately 2 mm, and a minimum width or an inner diameter of an intermediate region of the rectangular ring form of the first coil layer and the second coil layer may be approximately 160 mm.

The first coil layer, the interlayer insulating layer, and the second coil layer may be disposed as a single laminated structure.

Using the reception pad and the manufacturing method thereof according to the embodiments of the present disclosure as described above are used, it is made possible to maximize the WPT performance by optimizing the configuration of the reception pad. Also, the magnetic flux generated from a standard transmission pad such as SAE J2954 can be maximally received, thereby maximizing the efficiency of the WPT system.

BRIEF DESCRIPTION OF DRAWINGS

Embodiments of the present disclosure will become more apparent by describing in detail embodiments of the present disclosure with reference to the accompanying drawings, in which.

Figure 1:
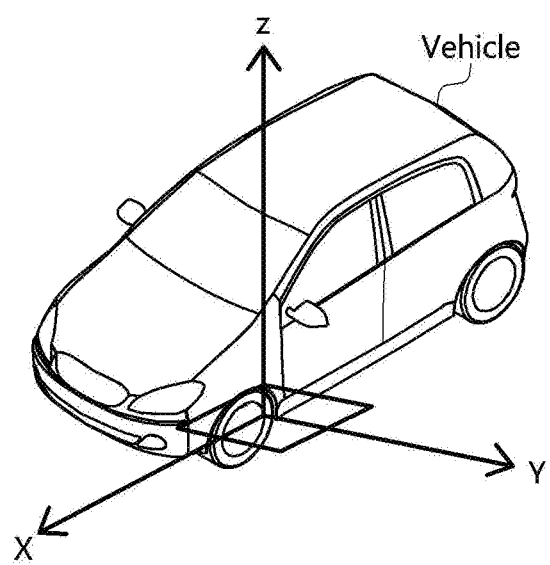
FIG. 1 is a conceptual diagram illustrating x-axis and y-axis defined in the SAE J2954 which can be employed in embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Embodiments of the present disclosure may be embodied in many alternate forms and should not be construed as limited to embodiments of the present disclosure set forth herein. While describing the respective drawings, like reference numerals designate like elements. The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be understood that although the terms "first," "second," etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings. Also, all values, dimensions, measurements and so forth provided herein are approximate unless stated otherwise.

Terms used in the present disclosure are defined as follows.

"Electric Vehicle (EV)": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be four or more wheeled vehicle manufactured for use primarily on public streets, roads.

The EV may be referred to as an electric car, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle (PEV)": An Electric Vehicle that recharges the on-vehicle primary battery by connecting to the power grid.

"Plug-in vehicle (PV)": An electric vehicle rechargeable through wireless charging from an electric vehicle supply equipment (EVSE) without using a physical plug or a physical socket.

"Heavy duty vehicle (H.D. Vehicle)": Any four- or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system (WCS)": The system for wireless power transfer and control between the GA and VA including alignment and communications. This system transfers energy from the electric supply network to the electric vehicle electromagnetically through a two-part loosely coupled transformer.

"Wireless power transfer (WPT)": The transfer of electrical power from the AC supply network to the electric vehicle by contactless means.

"Utility": A set of systems which supply electrical energy and include a customer information system (CIS), an advanced metering infrastructure (AMI), rates and revenue system, etc. The utility may provide the EV with energy through rates table and discrete events. Also, the utility may provide information about certification on EVs, interval of power consumption measurements, and tariff.

"Smart charging": A system in which EVSE and/or PEV communicate with power grid in order to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly that can transfer power. The automatic charging may be performed after obtaining necessary authentication and right.

"Interoperability": A state in which component of a system interwork with corresponding components of the system in order to perform operations aimed by the system. Also, information interoperability may mean capability that two or more networks, systems, devices, applications, or components can efficiently share and easily use information without giving inconvenience to users.

"Inductive charging system": A system transferring energy from a power source to an EV through a two-part gapped core transformer in which the two halves of the transformer, primary and secondary coils are physically separated from one another. In the present disclosure, the inductive charging system may correspond to an EV power transfer system.

"Inductive coupler": The transformer formed by the coil in the GA Coil and the coil in the VA Coil that allows power to be transferred with galvanic isolation.

"Inductive coupling": Magnetic coupling between two coils. In the present disclosure, coupling between the GA Coil and the VA Coil.

"Ground assembly (GA)": An assembly on the infrastructure side consisting of the GA Coil, a power/frequency conversion unit and GA controller as well as the wiring from the grid and between each unit, filtering circuits, housing(s) etc., necessary to function as the power source of wireless power charging system. The GA may include the communication elements necessary for communication between the GA and the VA.

"Vehicle assembly (VA)": An assembly on the vehicle consisting of the VA Coil, rectifier/power conversion unit and VA controller as well as the wiring to the vehicle batteries and between each unit, filtering circuits, housing(s), etc., necessary to function as the vehicle part of a wireless power charging system. The VA may include the communication elements necessary for communication between the VA and the GA.

The GA may be referred to as a primary device (PD), and the VA may be referred to as a secondary device (SD).

"Primary device": An apparatus which provides the contactless coupling to the secondary device. That is, the primary device may be an apparatus external to an EV. When the EV is receiving power, the primary device may act as the source of the power to be transferred. The primary device may include the housing and all covers.

"Secondary device": An apparatus mounted on the EV which provides the contactless coupling to the primary device. That is, the secondary device may be installed in the EV. When the EV is receiving power, the secondary device may transfer the power from the primary to the EV. The secondary device may include the housing and all covers.

"GA controller": The portion of the GA which regulates the output power level to the GA Coil based on information from the vehicle.

"VA controller": The portion of the VA that monitors specific on-vehicle parameters during charging and initiates communication with the GA to control output power level.

The GA controller may be referred to as a primary device communication controller (PDCC), and the VA controller may be referred to as an electric vehicle communication controller (EVCC).

"Magnetic gap": The vertical distance between the plane of the higher of the top of the litz wire or the top of the magnetic material in the GA Coil to the plane of the lower of the bottom of the litz wire or the magnetic material in the VA Coil when aligned.

"Ambient temperature": The ground-level temperature of the air measured at the subsystem under consideration and not in direct sun light.

"Vehicle ground clearance": The vertical distance between the ground surface and the lowest part of the vehicle floor pan.

"Vehicle magnetic ground clearance": The vertical distance between the plane of the lower of the bottom of the litz wire or the magnetic material in the VA Coil mounted on a vehicle to the ground surface.

"VA coil magnetic surface distance": the distance between the plane of the nearest magnetic or conducting component surface to the lower exterior surface of the VA coil when mounted. This distance includes any protective coverings and additional items that may be packaged in the VA Coil enclosure.

The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g. an electric vehicle) that may be touched and which is not normally energized but which may become energized in case of a fault.

"Hazardous live component": A live component, which under certain conditions can give a harmful electric shock.

"Live component": Any conductor or conductive component intended to be electrically energized in normal use.

"Direct contact": Contact of persons with live components. (See IEC 61440)

"Indirect contact": Contact of persons with exposed, conductive, and energized components made live by an insulation failure. (See IEC 61140)

"Alignment": A process of finding the relative position of primary device to secondary device and/or finding the relative position of secondary device to primary device for the efficient power transfer that is specified. In the present disclosure, the alignment may direct to a fine positioning of the wireless power transfer system.

"Pairing": A process by which a vehicle is correlated with the unique dedicated primary device, at which it is located and from which the power will be transferred. The pairing may include the process by which a VA controller and GA controller of a charging spot are correlated. The correlation/association process may include the process of the establishment of a relationship between two peer communication entities.

"Command and control communication": The communication between the EV supply equipment and the EV exchanges information necessary to start, control and terminate the process of WPT.

"High-level communication (HLC)": HLC is a special kind of digital communication. HLC is necessary for additional services which are not covered by command & control communication. The data link of the HLC may use a power line communication (PLC), but it is not limited.

"Low-power excitation (LPE)": LPE means a technique of activating the primary device for the fine positioning ad pairing so that the EV can detect the primary device, and vice versa.

"Service set identifier (SSID)": SSID is a unique identifier consisting of 32-characters attached to a header of a packet transmitted on a wireless LAN. The SSID identifies the basic service set (BSS) to which the wireless device attempts to connect. The SSID basically distinguishes multiple wireless LANs. Therefore, all access points (Aps) and all terminal/station devices that want to use a specific wireless LAN can use the same SSID. Devices that do not use a unique SSID are not able to join the BSS. Since the SSID is shown as plain text, it may not provide any security features to the network.

"Extended service set identifier (ESSID)": ESSID is the name of the network to which you want to connect. It is similar to SSID but can be a more extended concept.

"Basic service set identifier (BSSID)": BSSID consisting of 48 bits is used to distinguish a specific BSS. In the case of an infrastructure BSS network, the BSSID may be medium access control (MAC) of the AP equipment. For an independent BSS or ad hoc network, the BSSID can be generated with any value.

The charging station may comprise at least one GA and at least one GA controller managing the at least one GA. The GA may comprise at least one wireless communication device. The charging station may mean a place having at least one GA, which is installed in home, office, public place, road, parking area, etc.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

In embodiments according to the present disclosure, the light load driving or light load operation may include, for example, charging the high voltage battery with a charging voltage lower than a predetermined rated voltage in the latter half of charging for the high voltage battery connected to the VA in the WPT system. Also, the light load operation may include a case in which the high-voltage battery of EV is charged at a relatively low voltage and at a low speed by using a low-speed charger such as a household charger.

Hereinafter, embodiments according to the present disclosure will be explained in detail by referring to accompanying figures.

FIG. 1 is a conceptual diagram illustrating x-axis and y-axis defined in the SAE J2954 which can be employed in embodiments of the present disclosure.

As illustrated in FIG. 1, in the WPT system for EVs, a right-handed coordinate system may be used to define the structure and position of the transmission pad and the reception pad.

In the right-handed coordinate system, the front direction or the back-and-forth direction of the vehicle is defined as x-axis, the driver direction of a left steering vehicle or the left and right directions of the left steering vehicle is defined as y-axis, and the upward or downward direction of the vehicle is defined as z-axis. Also, the magnetic center of the GA coil may be defined as x=0 and y=0, and the ground surface may be defined as z=0.

Figure 2:
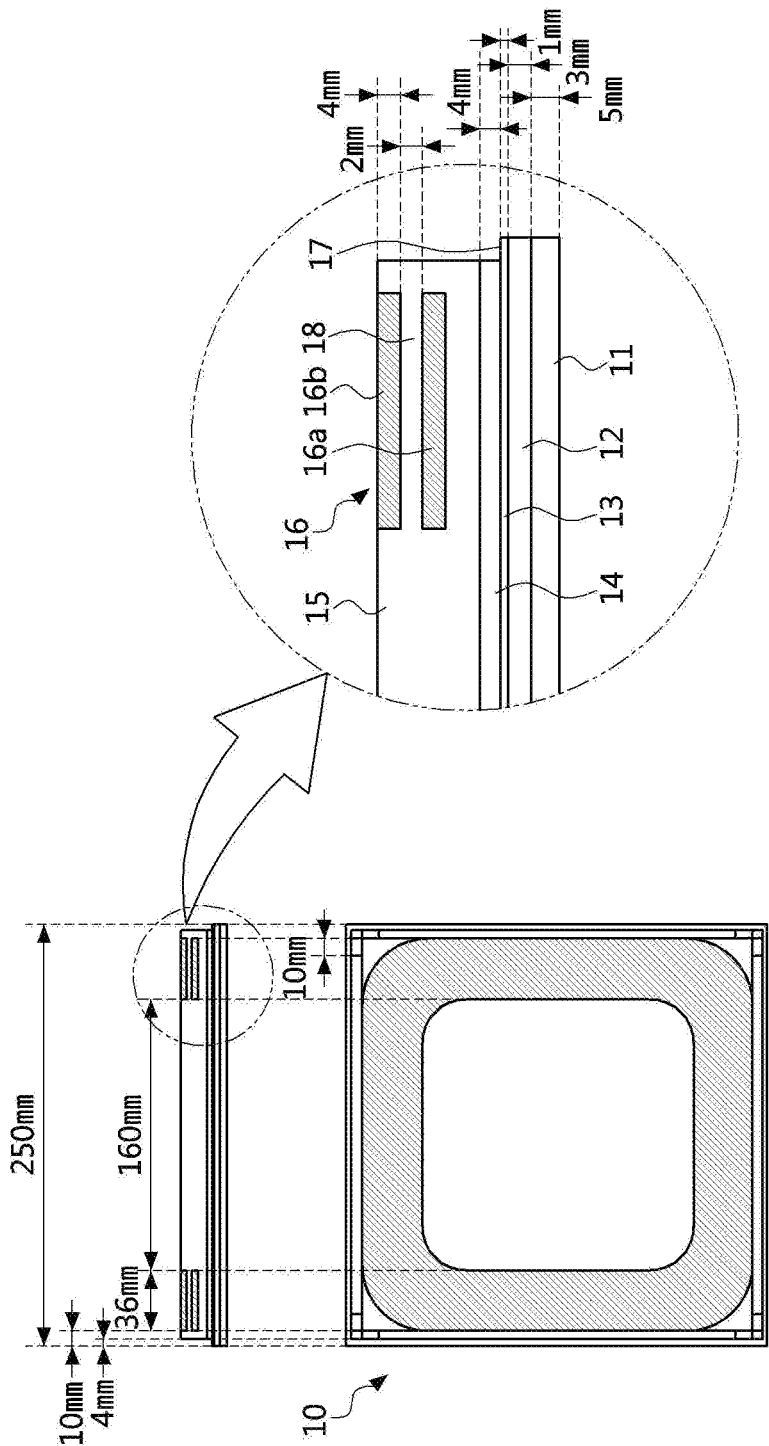
FIG. 2 is a view for explaining a reception pad of a WPT system according to embodiments of the present disclosure.

FIG. 2 is a view for explaining a reception pad of a WPT system according to embodiments of the present disclosure.

As shown in FIG. 2, a reception pad 10 according to the present embodiment, which is provided herein merely for demonstration purposes, may comprise a first insulating layer 11, a VA aluminum 12, a second insulating layer 13, a ferrite 14, a third insulating layer 15, and a coil 16 including a first coil layer 16a and a second coil layer 16b.

The first insulating layer 11 may be disposed on one side of the VA aluminum 12 so as to be arranged between the VA aluminum 12 and a body of the EV when the VA aluminum 12 is attached to the body of the EV. The first insulating layer 11 may be provided to provide electrical insulation between the body of the EV and the reception pad and to function to bring the reception pad into close contact with the body of the EV. The first insulating layer 11 may be a bonding layer having an insulating function, and the thickness of the first insulating layer 11 may be set to at least about 5 millimeters (mm) in consideration of the electrical insulating function and the adhesive/adhesion function.

The VA aluminum 12 may be a structure for shielding electromagnetic waves generated at the reception pad. The thickness of the VA aluminum 12 may be determined according to the intensity of a reception power specified in the WPT system, and may be 3 mm in the present embodiment.

The second insulating layer 13 may be disposed on the other side of the VA aluminum 12 and may take charge of an electrical insulating function between the VA aluminum 12 and the ferrite 14 thereon and/or a bonding function therebetween. The thickness of the second insulating layer 13 may be adjusted according to its material and requirements (insulation, etc.), and may be 1 mm in the present embodiment.

The ferrite 14 may be referred to as a magnetic core and may enhance the flux linkage induced in the coil 16 through high permeability and low conductivity characteristics. The ferrite 14 may have a plate shape, a U-shape, or a pot shape. In the present embodiment, the ferrite 14 has a plate shape. Also, in the present embodiment, the ferrite 14 may have a size smaller than that of the VA aluminum 12 roughly with respect to an interface therebetween. By such the configuration, the reception pad 10 may have a stepped portion 17 at its edge. The thickness of the ferrite 14 may be set to a size suitable for strengthening the flux linkage, and may be 4 mm in the present embodiment.

The third insulating layer 15 may be arranged on one side of the ferrite 14 and may be arranged to cover the majority of the coil 16 on the ferrite 14 and to support the coil 16 having the two-layer structure. The thickness of the third insulating layer 15 may be set to a suitable size according to the physical properties of its insulating material, the supporting structure of the coil 16, and the like, and may be 15 mm in the present embodiment.

The coil 16 may include the first coil layer 16a and the second coil layer 16b of a laminated structure. Thus, an interlayer insulating layer 18 may be disposed between the first coil layer 16a and the second coil layer 16b. The interlayer insulating layer 18 may be integrally formed of the same material as the third insulating layer 15, but may be formed of a separate insulating material and then embedded in the third insulating layer 15.

The first coil layer 16a may be embedded in the third insulating layer 15. The first coil layer 16a may have a configuration in which a plurality of windings (unit coils) are sequentially arranged on an x-y plane. The width of the sequentially arranged first coil layer 16a may be set differently according to the rated reception power of the reception pad, and may be 36 mm in the present embodiment.

The second coil layer 16b may be disposed on the first coil layer 16a with the interlayer insulating layer 18 therebetween The second coil layer 16b may be partially buried by the third insulating layer 15 and one side thereof may be exposed to the outside on one side of the third insulating layer 15. The second coil layer 16b may have a configuration in which a plurality of windings (unit coils) are sequentially arranged on an x-y plane. The width of the sequentially arranged second coil layer 16b may be set differently according to the rated reception power of the reception pad or the like. In the present embodiment, the width may be 36 mm for the reception pad of the EV WPT system. Of course, depending on the implementation, the number of unit coils included in the second coil layer 16b may be different from that of the first coil layer 16a. In such a case and considering an equidistant arrangement, the spacing between adjacent unit coils of the second coil layer 16b may be different from the spacing between adjacent unit coils of the first coil layer 16a.

According to the above-described configuration, the reception pad 10 may have a rectangular parallelepiped shape having a square shape and a thickness of about 28 mm. When viewed in the x-y plane or facing the ground, the coil 16 may have a width of 36 mm at a position which is 10 mm inward from the edge of the VA aluminum 12 and 6 mm inward from the edge of the ferrite 14, and may be arranged in a rectangular ring shape. In this case, the overall width of the reception pad 10 may be 250 mm, and the inner diameter of the coil 16 may be 160 mm.

Embodiments of a method of manufacturing the reception pad described above will be described as follows.

First, a basic insulating layer may be formed on one side of the square-shaped ferrite 14 having a thickness of about 4 mm and a width or length of about 242 mm. Here, the ferrite 14 may be plate-shaped or pot-shaped. The thickness of the basic insulating layer may be about 5 mm.

Then, the rectangular ring-shaped first coil layer 16a may be disposed on the basic insulating layer. The first coil layer 16a may be prepared in advance in a form of the square ring. A first width of the first coil layer 16a, which is measured respectively in the lateral direction (or x-direction) and the longitudinal direction (or y-direction), may be about 36 mm.

Then, the interlayer insulating layer 18 may be formed on the first coil layer 16a. The interlayer insulating layer 18 may be laminated on the first coil layer 16a so as to have a thickness of about 2 mm. Here, an insulating material of about 6 mm may be applied to the basic insulating layer together with the formation of the interlayer insulating layer 18 so as to form a flat surface with the interlayer insulating layer 18, but the present embodiment is not limited thereto.

Then, the second coil layer 16b may be disposed on the interlayer insulating layer 18 so as to overlap with the first coil layer 16a. The second coil layer 16b may be prepared in advance in the form of a square ring similarly to the first coil layer 16a. A second width of the second coil layer 16b, which is measured respectively in the lateral direction (or x-direction) and the longitudinal direction (or direction-direction), may be about 36 mm. Here, a minimum width or inner diameter of an intermediate region in the form of the square ring of the first coil layer 16a and the second coil layer 16b on one side of the ferrite 14 may be about 160 mm.

Then, an upper insulating layer may be formed by applying an insulating material on the basic insulating layer up to the height of one surface of the second coil layer 16b so that the second coil layer 16b is fixed and the one surface thereof is exposed.

In case that the basic insulating layer, the interlayer insulating layer 18, and the upper insulating layer have the same material and the same physical properties, the basic insulating layer, the interlayer insulating layer 18, and the upper insulating layer may be treated as a single insulating layer, and may be simply referred to herein as the third insulating layer 15.

Also, in the manufacturing process of the reception pad 10, it may be possible to dispose a bonding layer on the other side of the ferrite 14 and dispose the plate-shaped VA aluminum 12 on the other side of the ferrite 14. Here, a lower insulating layer or the first insulating layer 11 having elasticity may be formed on the VA aluminum 12. Of course, the first insulating layer 11 may be previously formed on the VA aluminum 12 before the VA aluminum 12 is bonded to the other side of the ferrite 14.

Meanwhile, the reception pad according to the present embodiment may be manufactured using various methods other than the above-described manufacturing method. For example, a single structure of the first coil layer 16a and the second coil layer 16b, which is a laminated structure having the interlayer insulating layer therebetween, may be formed in advance, and the single structure may be disposed on the ferrite 14 with the third insulating layer 15 therebetween.

Figure 3:
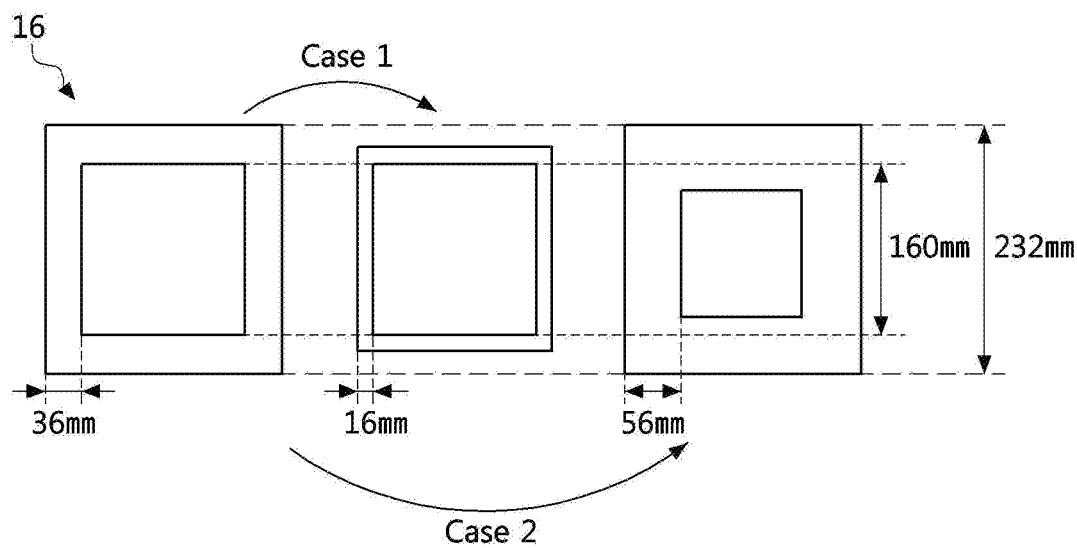
FIG. 3 is an exemplary view of experimental conditions for obtaining reception pad conditions of FIG. 2.

FIG. 3 is an exemplary view of experimental conditions for obtaining reception pad conditions of FIG. 2.

In the present embodiment, a VA aluminum 12 (i.e., 250×250×28 mm³) is used according to the condition proposed in the standard (i.e., SAE J2954) without consideration of an aluminum under body plate corresponding to the VA aluminum 12, and the plate-shaped ferrite 14 is used.

Since the reception pad is limited in its size due to its property to be mounted on the EV, it usually has a designated size for the EV, and thus it is substantially impossible to increase the outer diameter of the reception coil disposed on the reception pad. Therefore, in the present embodiment, an optimum reception pad structure is derived by experimenting with two cases under limited conditions.

In a first case ("Case 1"), the inner diameter of the coil 16 is maintained in the reception pad of a limited size, and the variation of the coupling coefficient is observed while decreasing the outer diameter of the coil 16 until the width of the coil 16 becomes 16 mm.

In a second case ("Case 2"), the outer diameter of the coil 16 is maintained in the reception pad of a limited size, and the variation of the coupling coefficient is observed while decreasing the inner diameter of the coil 16 until the width of the coil 16 becomes 56 mm.

As a result of the experiment, the coupling coefficient was observed to be maximized when the distance from the center of the coil 16 to the inside of the coil 16 is 80 mm, the width of the coil 16 is 36 mm, and the ratio of the width of the reception coil to the ferrite width is 0.149. Also, it was identified as preferable that the diameter of a single winding constituting the coil is 4 mm, the coil has a two-layer structure, and a gap between the coils of the two-layer structure or a thickness of an insulating layer between the coils of the two-layer structure is at least 2 mm.

Also, it was identified as preferable that the thickness of the VA aluminum is 3 mm, the thickness of the insulating layer or the insulating VA housing disposed on one side of the VA aluminum is 5 mm, the thickness of the ferrite is 4 mm, the spacing between the VA aluminum and the ferrite is 1 mm, and the thickness of the insulating layer disposed on one side of the ferrite, in which the coil of the two-layer structure are embedded, is 15 mm.

Figure 4:
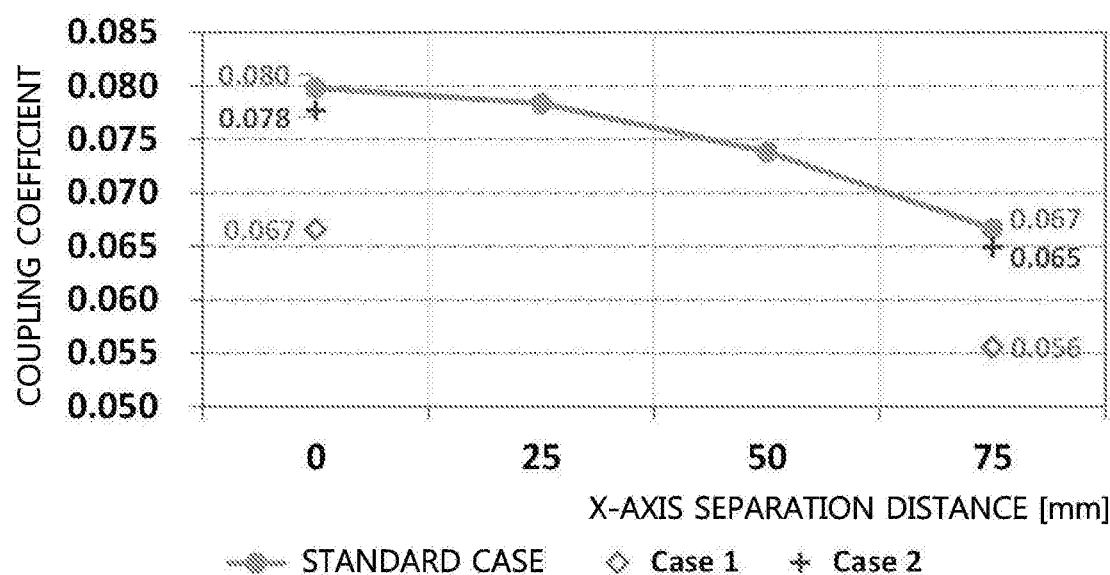
FIG. 4 is a graph showing coupling coefficients according to x-axis separation distances in experimental conditions of FIG. 3.
Figure 5:
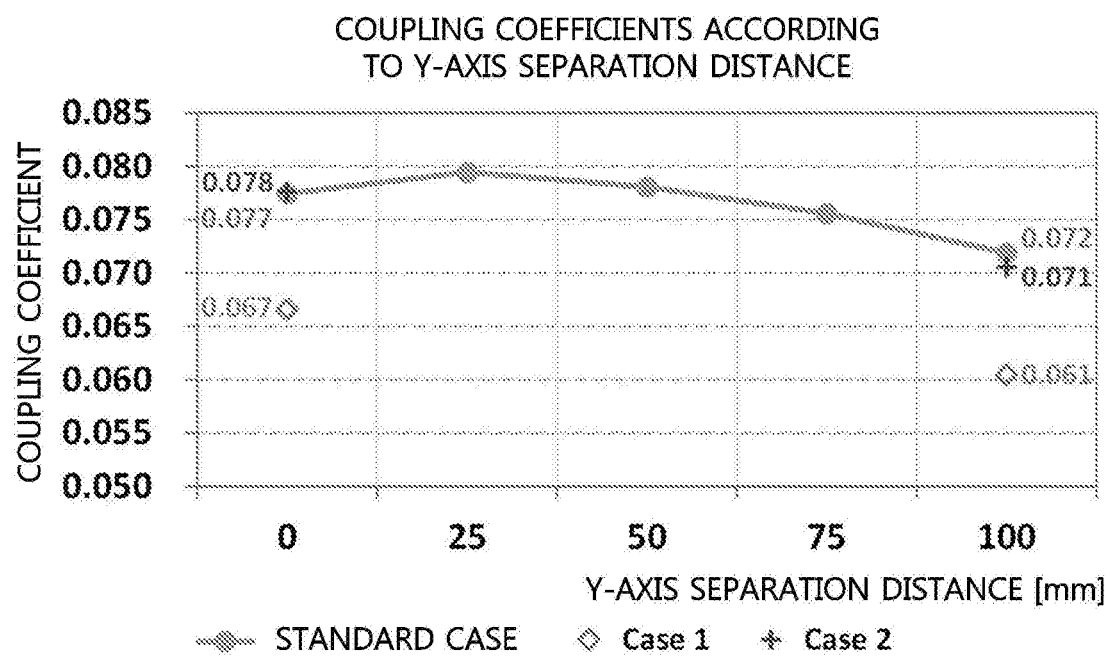
FIG. 5 is a graph showing coupling coefficients according to y-axis separation distances in experimental conditions of FIG. 3.

FIG. 4 is a graph showing coupling coefficients according to x-axis separation distances in experimental conditions of FIG. 3, and FIG. 5 is a graph showing coupling coefficients according to y-axis separation distances in experimental conditions of FIG. 3.

Specifically, FIGS. 4 and 5 are graphs showing coupling performances between a standard transmission pad and a reception pad having a size varying under conditions according to three cases (i.e., standard case of using a standard reception pad, Case 1, and Case 2). Here, a vertical separation distance between the reception pad and the transmission pad is 170 mm. Also, x-axis or y-axis separation conditions for the standard reception pad were as follows. For the x-axis separation, the coupling performance was measured up to a maximum of 75 mm at intervals of 25 mm. For the y-axis separation, the coupling performance was measured up to a maximum of 100 mm at intervals of 25 mm. Also, for the Case 1 and Case 2, only a condition of no separation and a condition of maximum separation (75 mm for x-axis and 100 mm for y-axis) were evaluated.

As shown in FIGS. 4 and 5, in Case 2 in which the width of the reception pad is increased, there is no significant difference from the coupling performance of the standard reception pad. Rather, the larger the separation distance, the smaller the coupling performance is.

In Case 1, it may be confirmed that the coupling performance is remarkably lower than that of the standard reception pad or the Case 2, regardless of the separation.

As described above, it may be preferable to form the width of the reception pad similarly to the coil width configuration proposed in the specification in terms of coupling performance and cost. In this case, a ratio (a/b) of the ferrite length (b) to the coil width (a) of the reception pad in the present embodiment may be about 0.14 to about 0.15.

This ratio is expected to exhibit similar coupling performance also when applied to a case in which the outer size of the reception pad and the ferrite length are increased.

Figure 6:
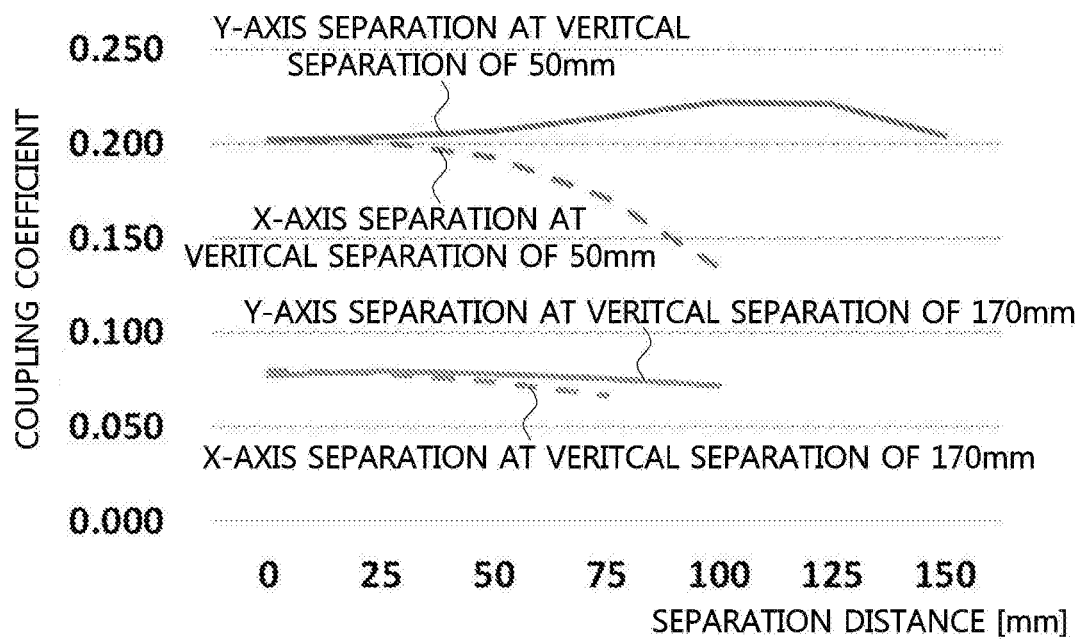
FIG. 6 is a graph showing coupling coefficients according to z-axis separation distance and x-axis or y-axis separation distance in the experimental conditions of FIG. 3.

FIG. 6 is a graph showing coupling coefficients according to z-axis separation distance and x-axis or y-axis separation distance in the experimental conditions of FIG. 3.

The reception pad according to the present embodiment may exhibit the following performance when it is operated together with the standard transmission pad defined in SAE J2954.

When the y-axis separation exists, the reception pad according to the present embodiment may exhibit a coupling coefficient of about 0.08 at a vertical separation of 50 mm and a coupling coefficient of about 0.2 at a vertical separation of 170 mm. The variation range of the couplings coefficient according to the separation is not large.

Also, when the x-axis separation exists, the reception pad according to the present embodiment may exhibit a coupling coefficient of about 0.13 to 0.2 at a vertical separation of 50 mm and a coupling coefficient of about 0.067 to 0.08 at a vertical separation of 170 mm. The variation range of the coupling coefficient according to the separation is large.

Table 1 below shows coupling coefficient distributions for respective conditions according to the present embodiment.

TABLE 1

|  | 0 | 25 | 50 | 75 | 100 | 125 | 150 |
|---|---|---|---|---|---|---|---|
| y-axis separation at vertical separation of 50 mm | 0.202 | 0.204 | 0.207 | 0.214 | 0.222 | 0.221 | 0.204 |
| y-axis separation at vertical separation of 170 mm | 0.077 | 0.079 | 0.078 | 0.076 | 0.072 | X | X |
| x-axis separation at vertical separation of 50 mm | 0.202 | 0.201 | 0.193 | 0.171 | 0.134 | X | X |
| x-axis separation at vertical separation of 170 mm | 0.080 | 0.078 | 0.074 | 0.067 | X | X | X |

As shown in Table 1, the maximum coupling coefficient between the GA and VA coils is 0.222 at the vertical separation of 50 mm, and the coupling coefficient between the GA and VA coils tends to remarkably decrease according to the vertical separation when the x-axis separation exists.

Also, the maximum coupling coefficient between the GA and VA coils is 0.080 at the vertical separation of 170 mm, and the coupling coefficient does not change much within the range of x-axis and y-axis separation distance of 75 mm to 100 mm.

Figure 7:
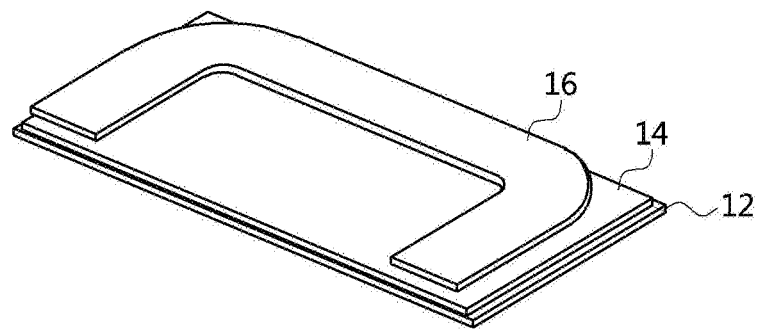
FIG. 7 is a partial perspective view showing a reception pad to which a plate-shaped ferrite is applied according to embodiments of the present disclosure.
Figure 8:
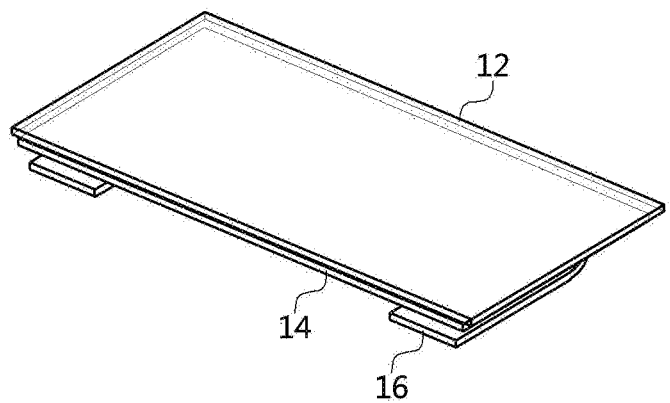
FIG. 8 is a perspective view showing a state in which a reception pad of FIG. 7 is attached to a vehicle.

FIG. 7 is a partial perspective view showing a reception pad to which a plate-shaped ferrite is applied according to embodiments of the present disclosure, and FIG. 8 is a perspective view showing a state in which a reception pad of FIG. 7 is attached to a vehicle.

As shown in FIGS. 7 and 8, a reception pad according to the present embodiment may comprise a coil 16, a ferrite 14 and a VA aluminum 12. The VA aluminum 12 may have a square planar shape with a thickness of several millimeters. The ferrite 14 may have a square planar shape with a thickness of several millimeters, and may be formed in a size smaller than the VA aluminum 12 such that several millimeters of the edge of the VA aluminum 12 are to be seen.

The coil 16 may have a rectangular ring shape with a curved corner on one side of the flat ferrite 14. The width of the coil 16 may be 36 mm as described above.

Figure 9:
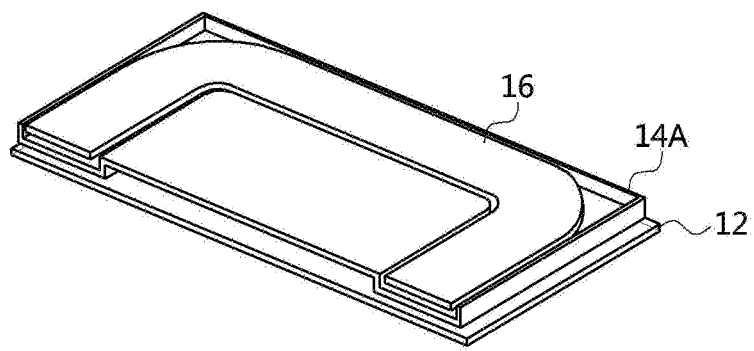
FIG. 9 is a partial perspective view showing a reception pad to which a U-shaped or POT-shaped ferrite is applied according to embodiments of the present disclosure.
Figure 10:
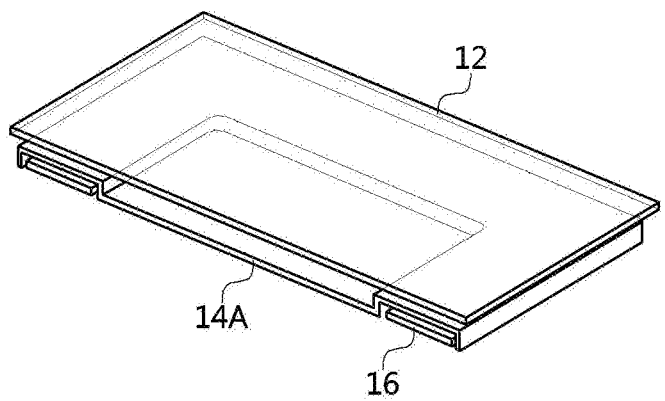
FIG. 10 is an exemplary view showing a state in which a reception pad of FIG. 9 is attached to a vehicle.

FIG. 9 is a partial perspective view showing a reception pad to which a U-shaped or POT-shaped ferrite is applied according to embodiments of the present disclosure, and FIG. 10 is an exemplary view showing a state in which a reception pad of FIG. 9 is attached to a vehicle.

As shown in FIGS. 9 and 10, a reception pad according to the present embodiment may comprise a coil 16, a ferrite 14A, and a VA aluminum 12. The VA aluminum 12 may have a square planar shape with a thickness of several millimeters. The ferrite 14A may have a pot shape made of a plate material having a thickness of several millimeters. When the ferrite 14A and the VA aluminum 12 are placed on a predetermined plane or x-y plane as overlapped with each other, the ferrite 14A may be manufactured to have a size smaller than the VA aluminum 12 such that several millimeters of the edges of the VA aluminum 12 are to be seen.

The VA aluminum 12 may be a portion attached to a lower body of the vehicle when the reception pad is mounted on the vehicle.

In the pot shape of the ferrite 14A, a center concave portion may be inserted into a central hollow portion of the coil 16, and an edge portion protruding at a predetermined height in one direction with a step around the center concave portion may be formed to surround the coil 16 in a customized size.

The coil 16 may be arranged in a form of being inserted into a concave portion of a rectangular ring shape arranged in an edge of the other side of the ferrite 14 having a form of an inverted pot.

The above-described reception pad may be housed in a housing or a case fixed to the lower body of the vehicle to be attached to the lower body of the vehicle.

Figure 11:
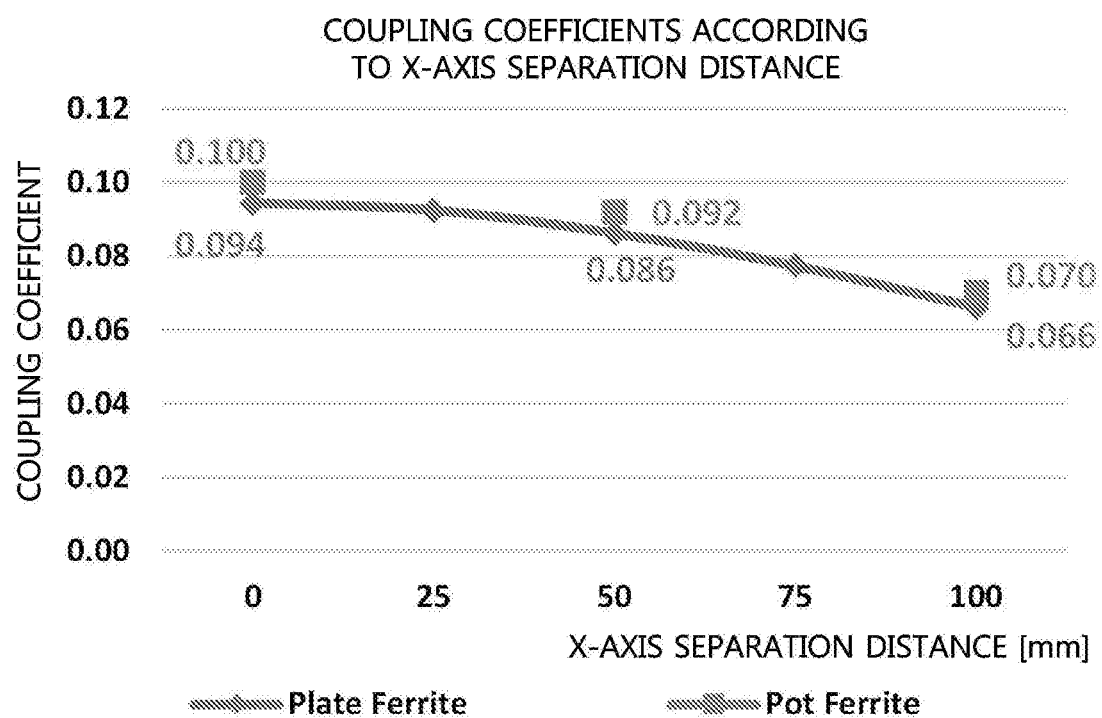
FIG. 11 is a graph showing coupling performances of the ferrite structures of the reception pads of FIGS. 7 and 9 according to x-axis separation distances.
Figure 12:
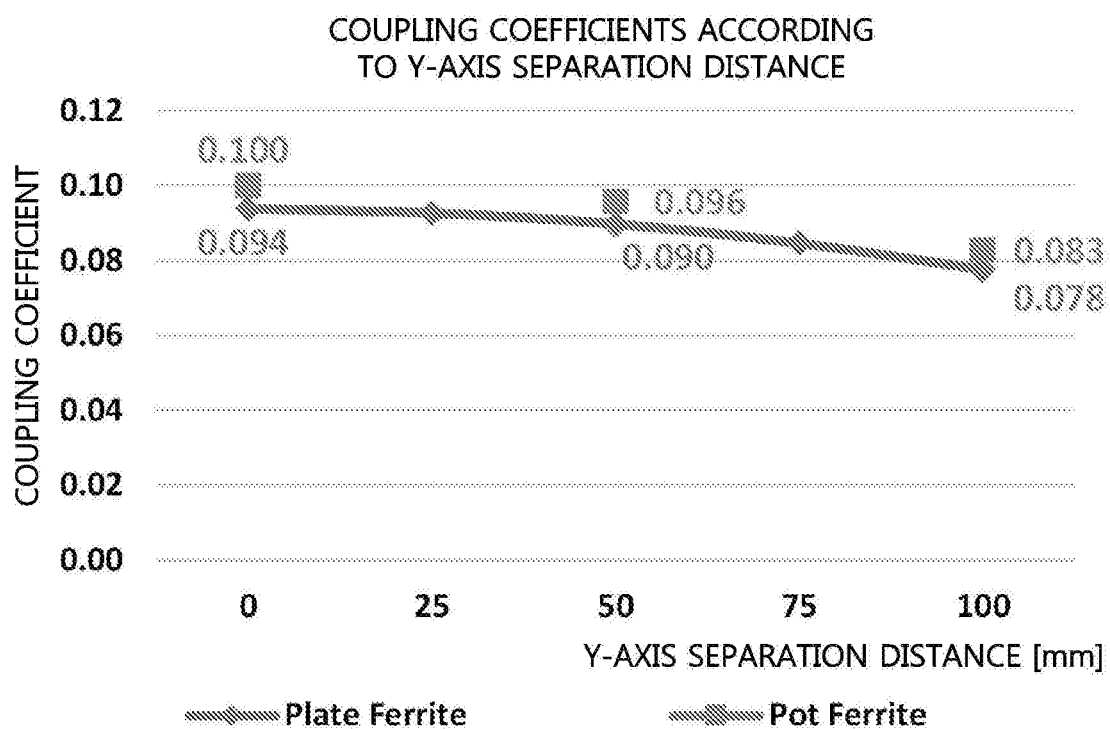
FIG. 12 is a graph showing coupling performances of the ferrite structures of the reception pads of FIGS. 7 and 9 according to y-axis separation distances.

FIG. 11 is a graph showing coupling performances of the ferrite structures of the reception pads of FIGS. 7 and 9 according to x-axis separation distances, and FIG. 12 is a graph showing coupling performances of the ferrite structures of the reception pads of FIGS. 7 and 9 according to y-axis separation distances.

As shown in FIG. 11, in the case that the plate-shaped ferrite is used, the coupling coefficient of the reception pad to the transmission pad decreases to 0.094, 0.091, 0.086, 0.077 and 0.066 when the x-axis separation distance increases stepwise to 0 mm, 25 mm, 50 mm, 75 mm, and 100 mm.

Also, in the case that the pot-shaped ferrite is used, the coupling coefficient of the reception pad to the transmission pad decreases to 0.100, 0.092 and 0.070 when the x-axis separation distance in the x-axis increases stepwise to 0 mm, 50 mm, and 100 mm.

Referring next to FIG. 12, in the case that the plate-shaped ferrite is used, the coupling coefficient of the reception pad to the transmission pad decreases to 0.094, 0.093, 0.090, 0.085, and 0.078 when the y-axis separation distance increases stepwise to 0 mm, 25 mm, 50 mm, 75 mm, and 100 mm. That is, as the y-axis separation distance increases, the decrease in the coupling coefficient also increases.

Also, in the case that the pot-shaped ferrite is used, the coupling coefficient of the reception pad to the transmission pad decreases to 0.100, 0.096 and 0.083 when the y-axis separation distance in the x-axis increases stepwise to 0 mm, 50 mm, and 100 mm.

As shown in the above embodiment, when the coupling performances according to the x-axis or y-axis separation distance for the case of the plate-shaped ferrite and the case of the pot-shaped ferrite are compared, at the vertical separation of 170 mm, the coupling performance is about 6% lower when the plate-shaped ferrite is applied than when the pot-shaped ferrite is applied.

This means that the coupling performance of the reception pad using the pot-shaped ferrite is slightly better than that of the reception pad using the plate-shaped ferrite.

Figure 13:
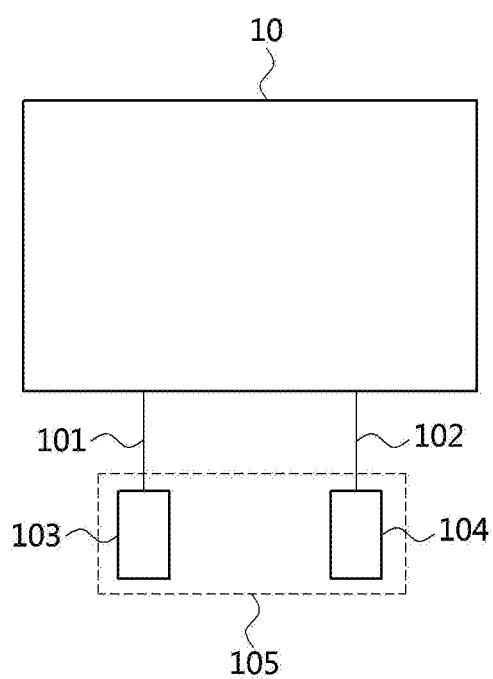
FIG. 13 is an exemplary view for explaining a lead wire structure which can be applied to a reception pad according to embodiments of the present disclosure.

FIG. 13 is an exemplary view for explaining a lead wire structure which can be applied to a reception pad according to embodiments of the present disclosure.

As shown in FIG. 13, a reception pad 10 according to the present embodiment may comprise a pair of lead wires 101 and 102. The lead wires 101 and 102 may be combined with separate terminals or connectors 103 and 104. Of course, depending on the implementation, the connectors 103 and 104 may have a structure 105 that is disposed integrally within a single housing.

The reception pad 10 having the lead wires 101 and 102 described above may be directly connected to the power conversion circuit of the in-vehicle power conversion unit. Also, depending on the implementation, the reception pad 10 may be coupled to a separate terminal block or connector unit, and may be electrically connected to the in-vehicle power conversion circuit via the terminal block or connector unit.

Meanwhile, a compensation capacitor may be used in a resonant network for magnetic coupling between the primary coil and the secondary coil of a WPT system. In this case, in the reception pad of the present embodiment, the above-described compensation capacitor may be arranged in the same space as the reception pad or may be configured using a separate board. Here, when disposed in the same space as the reception pad, the compensation capacitor may be embedded within the housing of the reception pad or coupled to the outside of the housing.

The above-described reception pad may be included in a VA of a WPT system.

That is, a VA according to the present embodiment may include a reception pad for receiving wireless power transferred from a charger or a GA outside the vehicle, and a power conversion unit for converting received power into battery power or the like by coupling to the reception pad. The reception pad comprises a square-shaped secondary coil having a X-width defined in the x-axis direction and a Y-width defined in the y-axis direction and having a central space, a ferrite coupling to the secondary coil, an a VA aluminum coupled to the ferrite.

Here, a first cross-sectional area for a first portion of the secondary coil having the X-width may be substantially equal to a second cross-sectional area for a second portion of the secondary coil having the Y-width. Further, a first area of insulating material within the first cross-sectional area may be substantially the same as a second area of insulating material within the second cross-sectional area.

Figure 14:
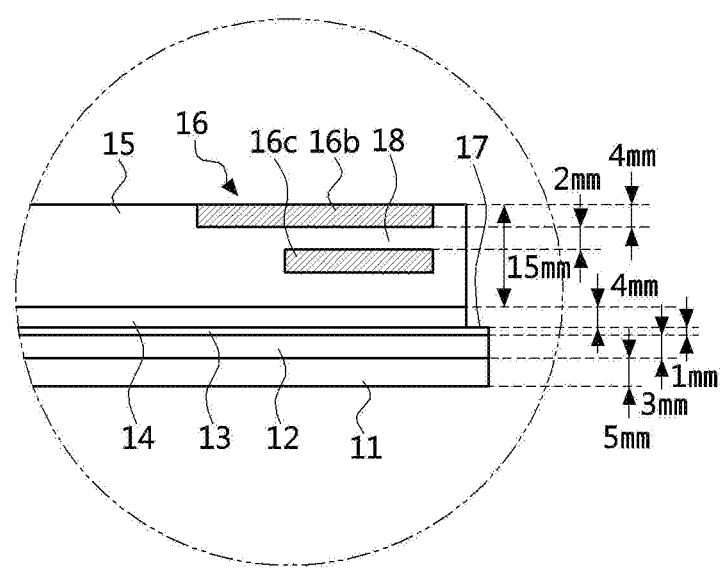
FIG. 14 is a partial cross-sectional view illustrating a structure of a reception pad according to embodiments of the present disclosure.

FIG. 14 is a partial cross-sectional view illustrating a structure of a reception pad according to embodiments of the present disclosure.

As shown in FIG. 14, a reception pad according to the present embodiment may be implemented to include a first coil layer 16c and a second coil layer 16b having different widths. Here, in order to ensure a coupling coefficient and performance similar to those in the case of having the same width, it is preferable that the smaller width is set to be a half or more of the larger width.

In the present embodiment, the width of at least one coil layer in the laminated coil layers is made different from the width of the other coil layer, so that the degree of freedom in coil arrangement and shape can be increased.

Figure 15:
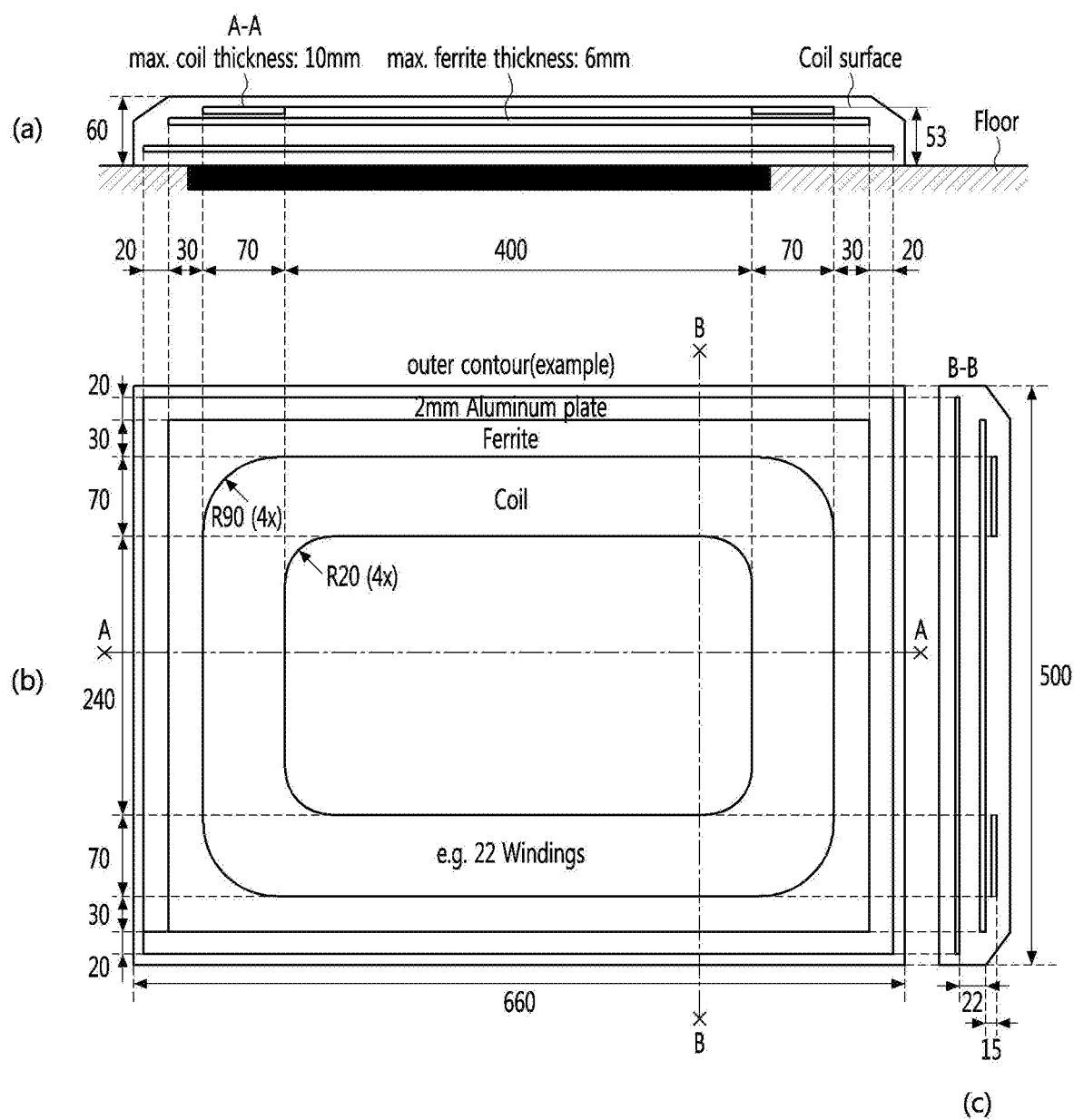
FIG. 15 is a configuration diagram illustrating an example of a transmission pad according to the SAE J2954 standard.

FIG. 15 is a configuration diagram illustrating an example of a transmission pad according to the SAE J2954 standard.

As shown in the cross-sectional view (a) and the plan view (b) of FIG. 15, the transmission pad is composed of a GA coil, a ferrite, an aluminum plate, and a housing covering them. The B-B cross-sectional structure is substantially the same as the cross-sectional structure shown in the A-A cross-sectional view except that the length of the central space (i.e., core area) of the GA coil in the x-direction is 240 mm.

The GA coil has a rectangular structure, and four corners of the rectangular structure have a shape bent with a predetermined radius. The coil width of the GA coil is substantially the same in the x-direction and the y-direction. That is, the coil width is 70 mm both in the x-direction or the y-direction. In this example, the GA coil is illustrated as a coil having 22 windings in a rectangular shape.

The thickness of the ferrite is 6 mm, and the thickness of the aluminum plate is 2 mm. The external thickness of the transmission pad is 60 mm, and the vertical height from the ground to the top of the GA coil is 53 mm (see SAE J2954). This vertical height may correspond to a vertical height from the bottom of the housing to the top of the ferrite in the case of other structures.

Figure 16:
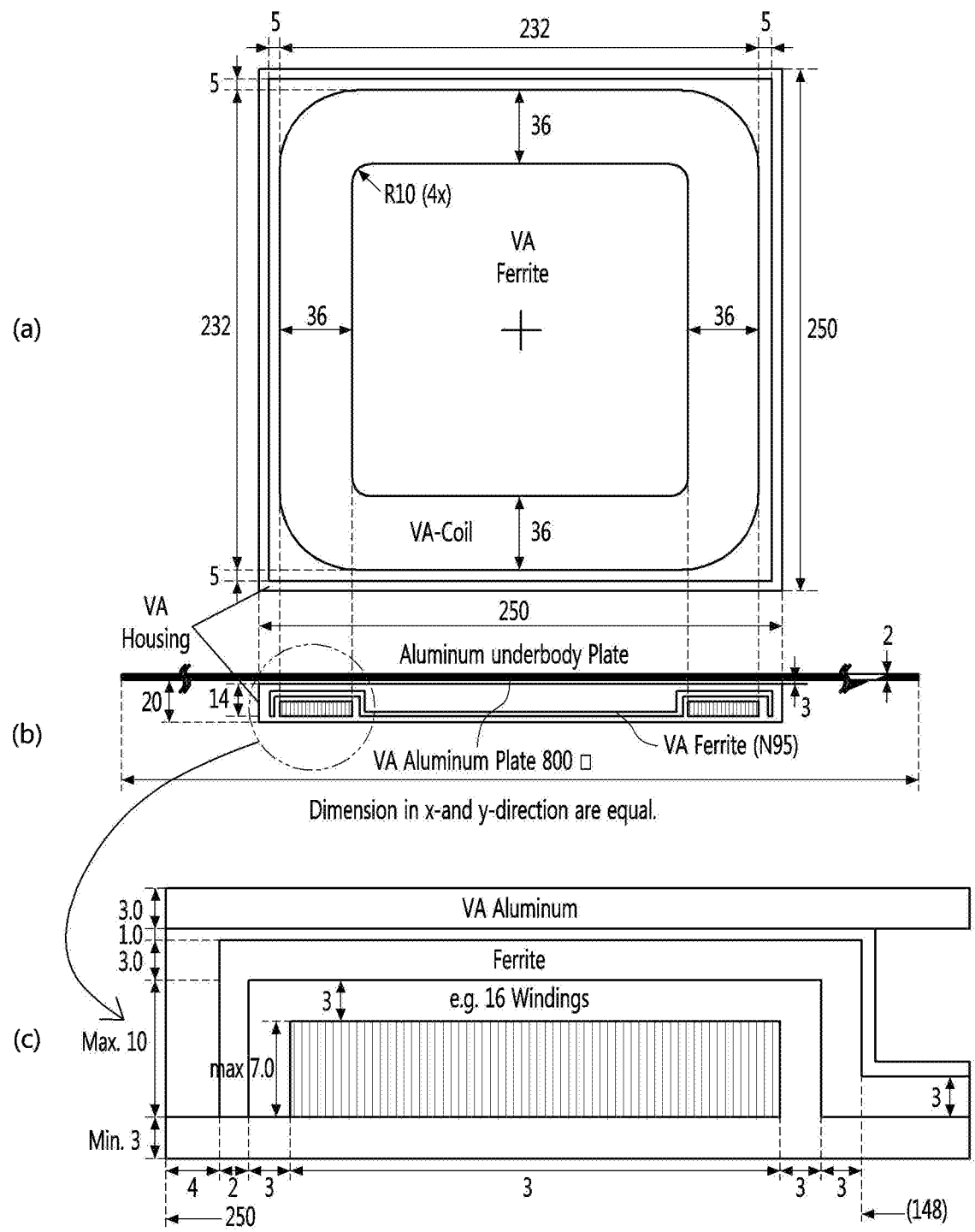
FIG. 16 is a configuration diagram illustrating an example of a reception pad according to the SAE J2954 standard.

FIG. 16 is a configuration diagram illustrating an example of a reception pad according to the SAE J2954 standard.

As shown in the plan view (a), central section view (b), and partial enlargement (c) of the central sectional view of FIG. 16, the reception pad comprises a VA aluminum, a VA ferrite, a VA coil, and an insulating VA housing.

The VA coil has a square structure, and four corners of the square structure have a shape bent with a predetermined radius. The maximum thickness of the VA coil is 7.0 mm, and the coil width is the same both in the x-direction and the y-direction. The coil width is 36 mm in the x-direction and y-direction, respectively. In this example, the GA coil is illustrated as a coil having 16 windings in a rectangular shape.

The thickness of the VA ferrite is 6 mm. The VA ferrite may have a U-shaped structure with a protruding center inserted into the center space (i.e., core area) of the VA coil.

The insulating AV housing is placed between the VA ferrite and the VA aluminum, surrounding the VA coil and covering the VA ferrite. The VA aluminum is disposed in contact with the aluminum underbody plate.

The size of the reception pad is 250 mm×250 mm, and the thickness of the reception pad is 20 mm except for the aluminum underbody plate.

The dimensions and spacing of the transmission pad and the reception pad in the above-described example are summarized in Table 2 below.

TABLE 2

|  | Transmission pad | Reception pad |
|---|---|---|
| External size | 660 * 500 mm$^2$ | 250 * 250 mm$^2$ |
| Aluminum shield | 640 * 480 * 2 mm$^3$ | 250 * 250 * 3 mm$^3$ |
| Aluminum underbody plate | Not applicable | 800 * 800 *2 mm$^2$ |

TABLE 2-continued

|  | Transmission pad | Reception pad |
|---|---|---|
| Ferrite | 600 * 440 * 6 mm$^3$ | 224 * 224 *3 mm$^3$ |
| Ferrite shape | Flat plate type | U-shaped structure with a protruding center |
| Coil outer diameter | 540 * 380 mm$^2$ | 232 * 232 mm$^2$ |
| Coil inner diameter | 400 * 240 mm$^2$ | 160 * 160 mm$^2$ |
| Coil thickness | 10 mm (max.) | 7 mm (max.) |
| Coil width/ Ferrite | 0.167/0.117 | 0.149/0.149 |
| Ground- Aluminum | 14 mm | — |
| Aluminum top - Ferrite top | 22 mm | — |
| Ferrite top - coil top | 15 mm | — |
| Aluminum top - Ferrite bottom | 16 mm (min.) | 1 mm |

In the WPT using the transmission pad and the reception pad of the comparative examples, under the cases that the vertical separation distance between the transmission and reception coils included in the Z-classes 1 and 2 (Z1 and Z2) is 50 mm or 170 mm, coupling performances between the SAE J2954 transmission and reception pads were evaluated.

According to the criteria presented in the comparative examples, the performances at the vertical separation of 50 mm were evaluated up to the x-axis or y-axis separation distance of 100 mm or 150 mm respectively, and the performances at the vertical separation of 170 mm were evaluated up to the x-axis or y-axis separation distance of 75 mm or 100 mm respectively. Here, the reception pad conditions proposed in SAE J2954 are applied to the reception pad without changes. The meaning of each axis (x-axis, y-axis, and z-axis) is as described in FIG. 1.

As a result of experiments, it was identified that the case of the present embodiment is superior to the case of using the reception pad of the comparative example for the transmission pad of the same standard in the coupling coefficient and the WPT performance.

While the embodiments of the present disclosure and their advantages have been described in detail, it should be understood that various changes, substitutions and alterations may be made herein without departing from the scope of the disclosure.

What is claimed is:

1. A reception pad for a wireless power transfer (WPT) system, the reception pad comprising:

a plate-shaped ferrite; an insulating layer disposed on one side of the ferrite;

a first coil layer disposed on the insulating layer;

an interlayer insulating layer disposed on the first coil layer; and a second coil layer disposed on the interlayer insulating layer, wherein the insulating layer at least partially surrounds the first coil layer and the second coil layer, the first coil layer and the second coil layer at least partially overlap each other and are arranged in a rectangular ring form on the one side of the ferrite, and a ratio of a width which is larger between a first width of the first coil layer and a second width of the second coil layer to a first length of the ferrite in a width direction corresponding to the first width or the second width is 0.14 to 0.15.

2. The reception pad according to claim 1, wherein the first width and the second width are equal to each other, and the first width is approximately 36 millimeters (mm) when the first length of the ferrite is approximately 242 mm.

3. The reception pad according to claim 2, wherein a thickness of the first coil layer is equal to a thickness of the second coil layer, and the thickness of the first coil layer is approximately 4 mm.

4. The reception pad according to claim 3, wherein a thickness of the interlayer insulating layer is approximately 2 mm.

5. The reception pad according to claim 4, wherein a minimum width or an inner diameter of an intermediate region of the rectangular ring form of the first coil layer and the second coil layer is approximately 160 mm.

6. The reception pad according to claim 5, further comprising:
   a plate-shaped vehicle assembly (VA) aluminum on another side of the ferrite;
   a lower insulating layer disposed on the VA aluminum; and
   a bonding layer disposed between the ferrite and the VA aluminum.

7. The reception pad according to claim 1, wherein the first width and the second width are different from each other, and the large width is approximately 36 mm when the first length of the ferrite is approximately 242 mm.

8. A method of manufacturing a reception pad for a wireless power transfer (WPT) system, the method comprising:
   forming a first insulating layer on one side of a plate-shaped ferrite;
   disposing a first coil layer in a rectangular ring form on the first insulating layer;
   disposing an interlayer insulating layer on the first coil layer;
   disposing a second coil layer on the interlayer insulating layer so as to at least partially overlap with the first coil layer; and
   forming a second insulating layer on the first insulating layer so that the second insulating layer at least partially surrounds the interlayer insulating layer and the second coil layer, and so that the second coil layer is exposed from the second insulating layer,
   wherein a ratio of a width which is larger between a first width of the first coil layer and a second width of the second coil layer to a first length of the ferrite in a width direction corresponding to the first width or the second width is 0.14 to 0.15.

9. The method according to claim 8, wherein:
   the first width and the second width are equal to each other, and the first width is approximately 36 millimeters (mm) when the first length of the ferrite is approximately 242 mm,
   a thickness of the first coil layer is equal to a thickness of the second coil layer, the thickness of the first coil layer is approximately 4 mm, and a thickness of the interlayer insulating layer is approximately 2 mm, and
   a minimum width or an inner diameter of an intermediate region of the rectangular ring form of the first coil layer and the second coil layer is approximately 160 mm.

10. The method according to claim 8, further comprising:
    disposing a plate-shaped vehicle assembly (VA) aluminum on another side of the ferrite with a bonding layer disposed therebetween; and
    forming a lower insulating layer on the VA aluminum.

11. The method according to claim 8, wherein:
    the first width and the second width are different from each other, and the large width is approximately 36 mm when the first length of the ferrite is approximately 242 mm,
    a thickness of the first coil layer is equal to a thickness of the second coil layer, and the thickness of the first coil layer is approximately 4 mm,
    a thickness of the interlayer insulating layer is approximately 2 mm, and
    a minimum width or an inner diameter of an intermediate region of the rectangular ring form of the first coil layer and the second coil layer is approximately 160 mm.

12. The method according to claim 8, wherein the first coil layer, the interlayer insulating layer, and the second coil layer are disposed as a single laminated structure.

\* \* \* \* \*